(12) United States Patent
Hardin

(10) Patent No.: US 7,077,369 B2
(45) Date of Patent: Jul. 18, 2006

(54) STABLE TRIPOD FOR TELESCOPE

(75) Inventor: Larry C. Hardin, Bandon, OR (US)

(73) Assignee: Hardin Optical Co., Bandon, OR (US)

( * ) Notice: Subject to any disclaimer, the term of this patent is extended or adjusted under 35 U.S.C. 154(b) by 0 days.

(21) Appl. No.: 10/625,023

(22) Filed: Jul. 23, 2003

(65) Prior Publication Data

US 2005/0017138 A1   Jan. 27, 2005

(51) Int. Cl.
*F16M 11/38*   (2006.01)
(52) U.S. Cl. ............... 248/166; 248/163.1; 248/177.1; 248/188.8; 248/188.7; 16/32; 16/19
(58) Field of Classification Search ............... 248/166, 248/163.1, 178.1, 188.2, 188.8, 168, 169, 248/170, 171, 434, 435, 188.6, 188.9, 177.1, 248/188.7; 16/32, 19, 45, 35 R
See application file for complete search history.

(56) References Cited

U.S. PATENT DOCUMENTS

| | | | | |
|---|---|---|---|---|
| 270,605 | A | * | 1/1883 | Paepke ........................... 16/48 |
| 331,435 | A | * | 12/1885 | Peebles .................... 280/43.15 |
| 1,007,022 | A | | 10/1911 | Doll |
| 1,017,464 | A | * | 2/1912 | Rae ............................... 16/32 |
| 1,133,798 | A | | 3/1915 | Hall |
| 1,495,458 | A | * | 5/1924 | Thalhammer ............... 248/169 |
| 1,757,106 | A | * | 5/1930 | Apple .......................... 68/173 |
| 2,139,503 | A | | 12/1938 | Jordan |
| 2,160,538 | A | * | 5/1939 | Cavuoti .................. 248/188.91 |
| 2,262,288 | A | | 11/1941 | Klipstein et al. |
| 2,341,542 | A | * | 2/1944 | Grime ....................... 254/93 H |
| 2,357,165 | A | * | 8/1944 | Brady ...................... 248/188.7 |
| 2,490,956 | A | * | 12/1949 | Freund .......................... 5/600 |
| 2,534,659 | A | * | 12/1950 | Cardona ................... 248/188.5 |
| 2,668,682 | A | * | 2/1954 | Dalton ........................ 248/169 |
| 2,803,510 | A | * | 8/1957 | Carbary ................. 312/351.13 |
| 2,828,578 | A | * | 4/1958 | McCabe ................... 248/188.4 |
| 2,874,860 | A | * | 2/1959 | King ........................... 414/743 |
| 3,312,432 | A | * | 4/1967 | Pfeiffer et al. .............. 248/646 |
| 3,455,526 | A | | 7/1969 | Orii |
| 3,545,707 | A | | 12/1970 | Orii |
| 3,602,464 | A | | 8/1971 | Orii |
| 4,077,086 | A | | 3/1978 | Butler |
| 4,196,881 | A | * | 4/1980 | Davidson ..................... 248/157 |
| 4,199,123 | A | * | 4/1980 | Weber et al. ................ 248/168 |
| 4,339,842 | A | * | 7/1982 | Fontana et al. ................. 16/32 |
| 4,364,148 | A | * | 12/1982 | McVicker ....................... 16/32 |
| 4,570,886 | A | * | 2/1986 | Mooney ................... 248/186.1 |
| 4,747,180 | A | | 5/1988 | Screen |
| 4,852,836 | A | | 8/1989 | Kawazoe |

(Continued)

FOREIGN PATENT DOCUMENTS

CH    670991    7/1989

(Continued)

*Primary Examiner*—Kimberly T. Wood
(74) *Attorney, Agent, or Firm*—Chernoff, Vilhauer, McClung & Stenzel, LLP

(57) ABSTRACT

The present invention provides a stable tripod stand for sensitive optical devices such as telescopes and the like. The tripod may be moved around on wheels which are coupled to casters and when positioned may be secured to the ground to provide an adjustable and highly stable support that significantly reduces the incidence of jitter. The tripod includes a stabilizer member that extends through the casters to selectively engage the ground. The leg members of the tripod have a triangular shape and support links between the platform and the leg members form interlocking triangular supports which reinforce the leg members.

9 Claims, 4 Drawing Sheets

U.S. PATENT DOCUMENTS

| | | |
|---|---|---|
| 5,042,110 A | 8/1991 | Orii |
| 5,046,790 A | 9/1991 | Onomoto et al. |
| 6,055,704 A * | 5/2000 | Leibman .................. 16/35 R |
| 6,361,252 B1 | 3/2002 | Leitheiser |
| 6,591,449 B1 | 7/2003 | Parkin |
| 6,637,071 B1 | 10/2003 | Sorensen |

FOREIGN PATENT DOCUMENTS

| | | |
|---|---|---|
| DE | 4321739 | 1/1995 |
| DE | 10126962 | 10/2002 |
| FR | 1128140 | 1/1957 |
| GB | 2 333 445 A | 7/1999 |
| JP | 622214003 | 9/1987 |
| JP | 63203402 | 8/1988 |
| JP | 5116502 | 5/1993 |
| JP | 2000127706 | 5/2000 |
| JP | 2000343904 | 12/2000 |
| WO | PCT/GB00/01304 | 10/2000 |

* cited by examiner

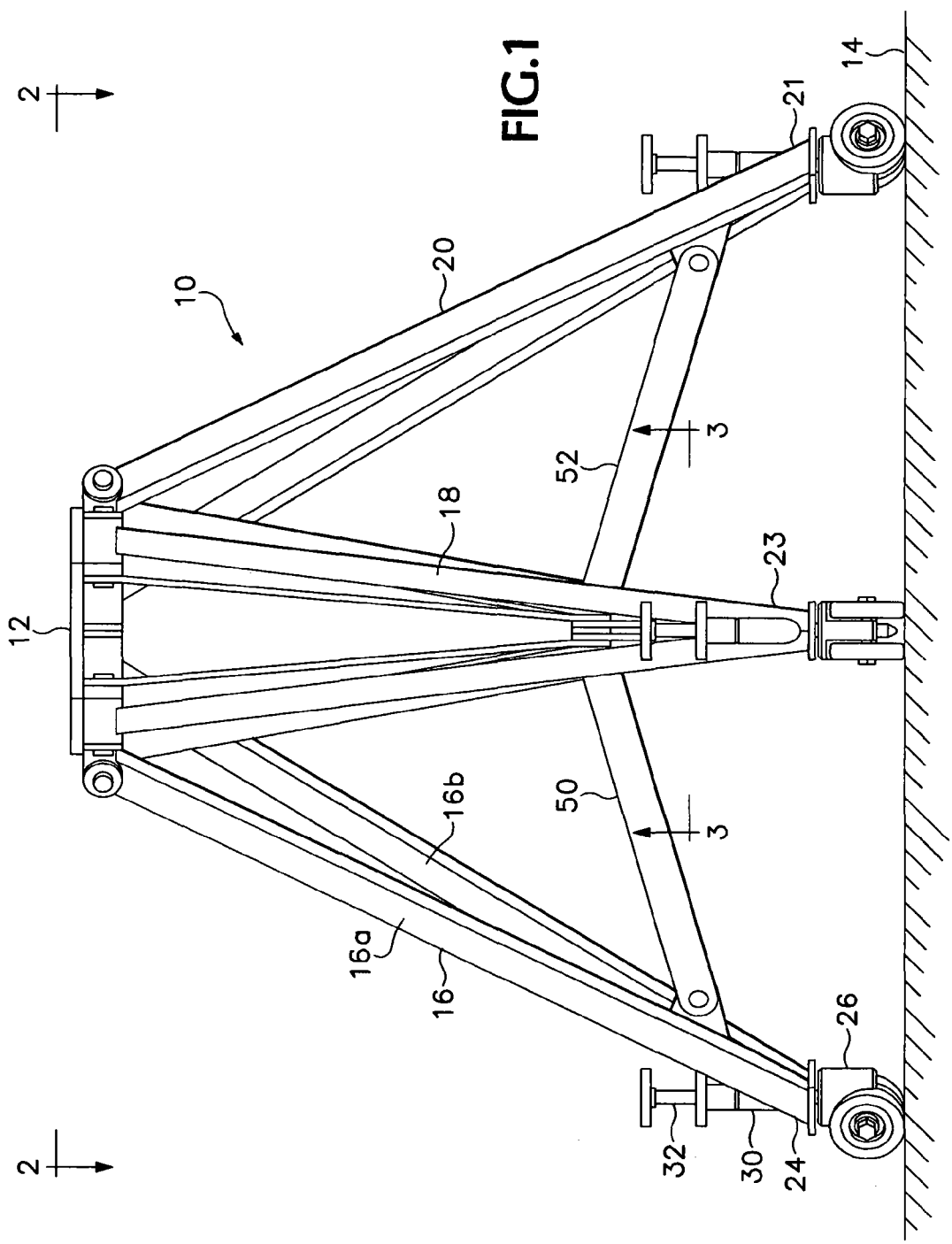

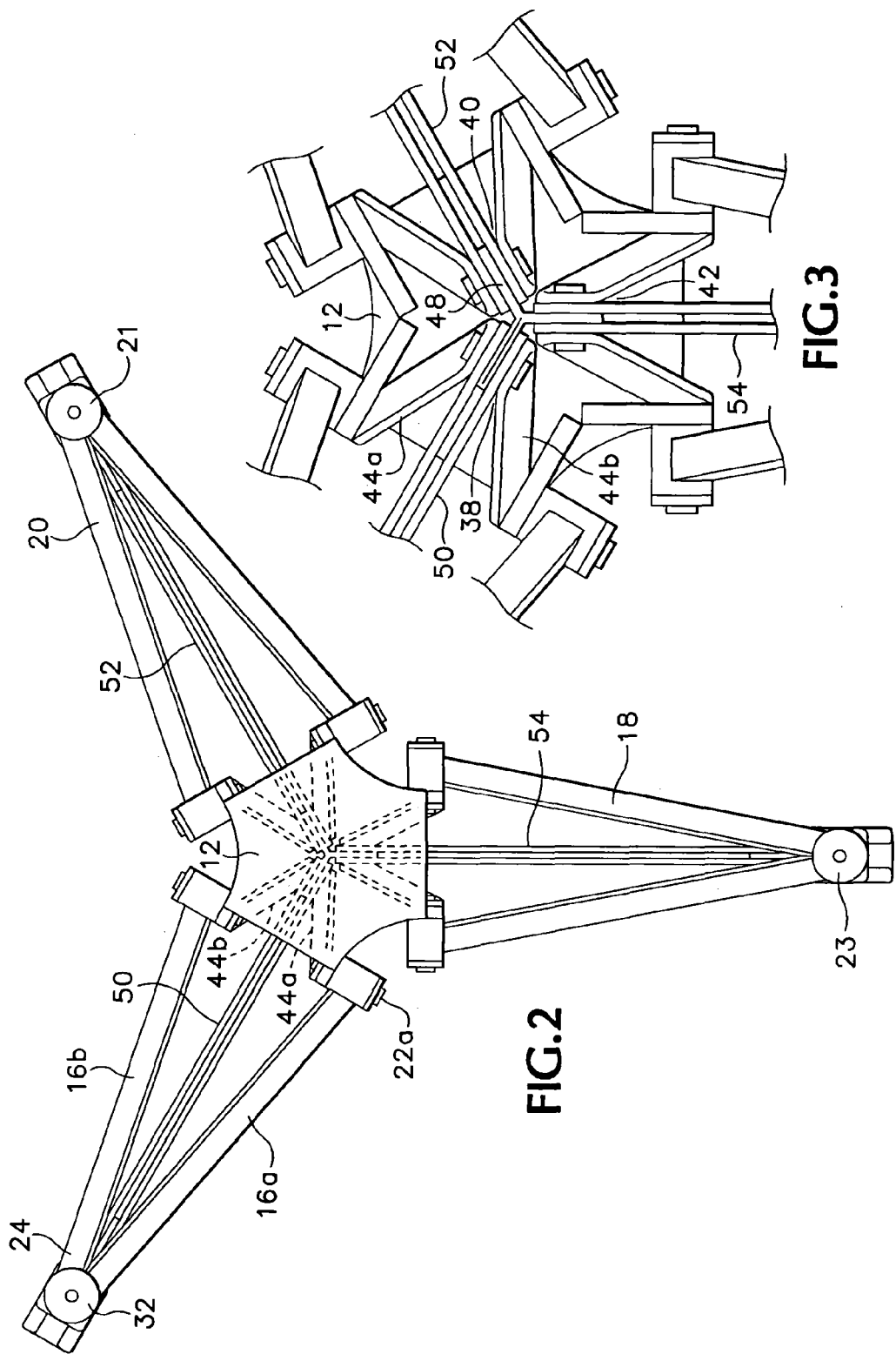

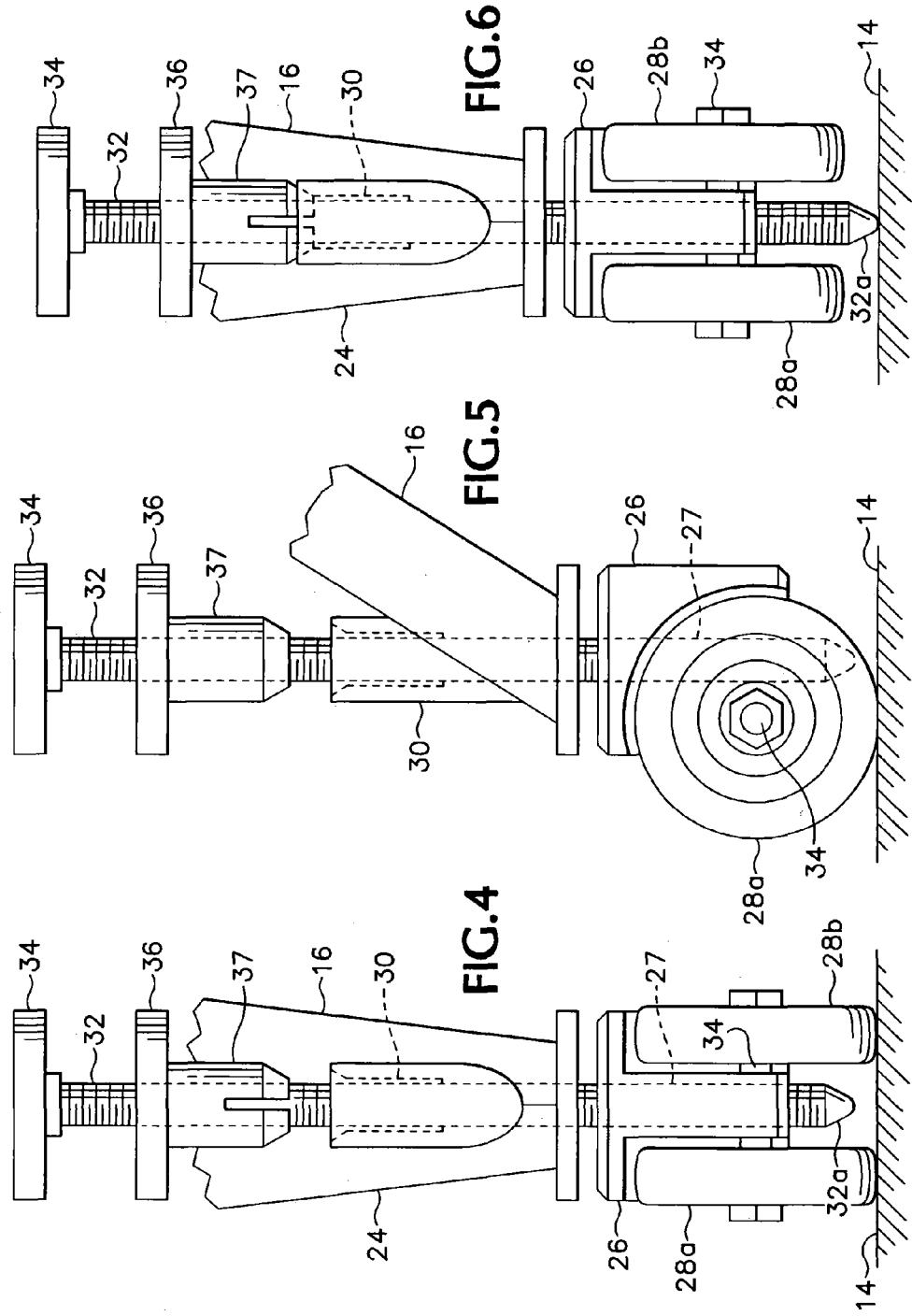

STABLE TRIPOD FOR TELESCOPE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The following invention relates to a tripod stand and more particularly to a tripod stand for supporting a device above a horizontal surface such as the ground.

Precision instruments, such as cameras and telescopes, require stable support structures that are moveable and provide a degree of adjustability, yet which can provide stability free of jitter. In the past, tripods have been used for this purpose including tripods having legs with wheeled caster elements. Wheeled casters permit the telescope or camera to be moved about and pointed in different directions as desired by the user. However, such arrangements are inherently unstable. This is especially critical for telescopes. Once proper aim at a target is achieved with a telescope, it becomes very important that the support provided by the tripod become very stable. In the past, tripods with casters have included locking features which lock the wheels and keep them from rotating. Such structures, however, are inherently prone to wobble because wheels do not provide a stable and firm contact with the ground and the parts involved in mounting the wheels generally allow the wheels and/or casters to slip or rotate causing the base supporting the telescope to move thereby disturbing the alignment of the telescope with its target. In addition, as designed most tripods are not structurally rigid. They are not braced properly and tend to wobble. This is unacceptable for precision instruments such as telescopes.

BRIEF SUMMARY OF THE INVENTION

The present invention provides a stable tripod stand for sensitive optical devices such as telescopes and the like. The tripod may be moved around on wheels which are coupled to casters and when positioned may be secured to the ground to provide an adjustable and highly stable support that significantly reduces the incidence of jitter. The tripod includes a stabilizer member that extends through the casters to selectively engage the ground. The leg members of the tripod have a triangular shape and support links between the platform and the leg members form interlocking triangular supports which reinforce the leg members.

The foregoing and other objectives, features and advantages of the invention will be more readily understood upon consideration of the following detailed description, taken in conjunction with the accompanying drawings.

BRIEF DESCRIPTION OF THE SEVERAL DRAWINGS

FIG. 1 is a front view of the tripod stand of the present invention.

FIG. 2 is a top view of the tripod stand of FIG. 1 taken along line 2—2.

FIG. 3 is a partial bottom view of the tripod stand of FIG. 1 taken along line 3—3.

FIG. 4 is a front elevation view of one of the feet of the tripod stand of the FIG. 1 and its associated caster assembly.

FIG. 5 is a side view of one of the feet of the tripod stand of FIG. 4.

FIG. 6 is a front view of the tripod stand of FIG. 4 illustrating the operation of the stabilizer bolt.

DETAILED DESCRIPTION OF THE INVENTION

Figures 7, 8:
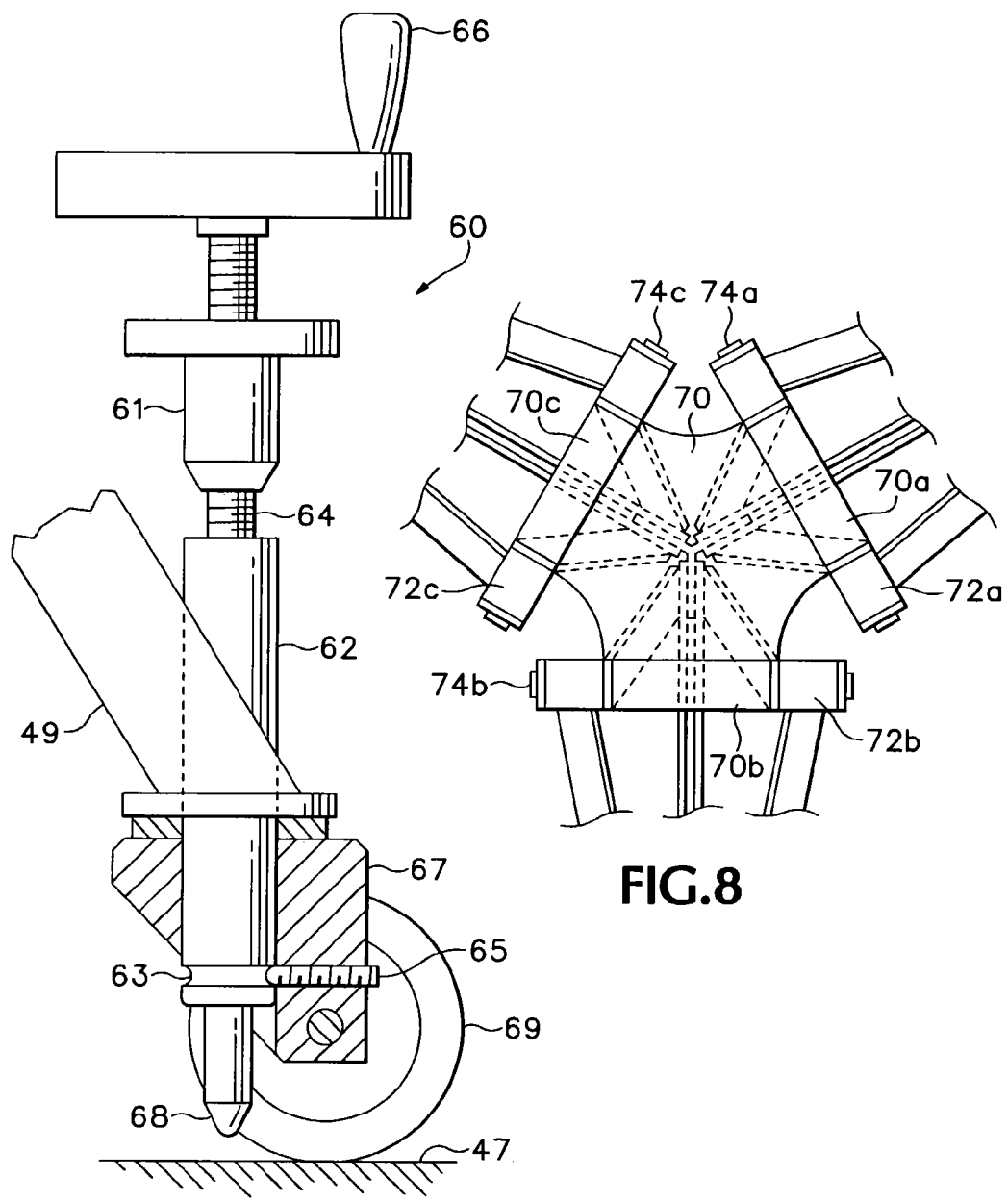
FIG. 7 is a side view of an alternative embodiment of a tripod foot.
FIG. 8 is a partial top cutaway view of an alternative support platform structure.

A tripod 10 as shown in FIG. 1 includes a support platform 12 supported above a ground surface 14 by three leg assemblies 16, 18 and 20. All three of the leg assemblies 16, 18 and 20 are identical so reference will be made to only one of the assemblies for illustration purposes.

Referring to leg assembly 16, the leg assembly includes a pair of leg members 16a and 16b coupled to the support platform 12 a predetermined distance apart by pins 22a and 22b (refer to FIG. 2). The leg members 16a and 16b are inclined inwardly toward each other and join together at the foot 24 of the leg assembly 16 thereby forming a narrow triangle. In the case of the leg assembly shown in the preferred embodiment, the leg members such as 16a and 16b are welded to the foot 24. It is not necessary that this be the case, however, and each of these elements may be separate pieces joined by fastening devices.

Referring to FIGS. 4, 5, and 6, at the bottom of the foot 24, there is a caster 26 which includes a pair of wheels 28a and 28b. The foot 24 has a tube 30 which is hollow and is threaded to receive a stabilizer bolt 32. The stabilizer bolt 32 is hand-turned by a knob 34 and extends through the caster 26, between the wheels 28a and 28b and engages the ground 14. The bolt 32 can be turned until the wheels are lifted clear of the ground 14 if desired. A locking sleeve or nut 36 may be used to tighten the stabilizer bolt after the desired adjustment has been made. The caster 26 includes a body having a threaded core 27 to receive the adjustment bolt 32. The bolt 32 has a pointed end 32a for penetrating the ground surface 14 so as to anchor the tripod 10.

Referring to FIG. 2, the platform base 12 is roughly hexagonal which permits pairs of leg members, such as leg members 16a and 16b, to be coupled to it a predetermined distance apart. Thus, the pair of leg members 16a and 16b, the foot 24 and the coupling to the platform base 12 form a triangle. The triangular structure of each of the leg assemblies 16, 18, 20 provides stability in the respective plane formed by each leg assembly triangle.

To make the legs even more stable, each leg assembly has a complementary pair of support link assemblies, 38, 40 and 42 (see FIG. 3). Each assembly is identical so reference will be made to leg assembly 38 for purposes of illustration. Pairs of vertical struts 44a and 44b, which are coupled to the leg members 16a and 16b by pins 22a and 22b, extend substantially vertically downwardly from the support platform base to a central point 48 directly below the platform base. The central point 48 is a spider connector to which stabilizer link assembles 50, 52 and 54 are joined to leg assemblies 16, 18 and 20 at their respective feet. From the central point 48, three stabilizer link assemblies 50, 52, and 54 extend toward each of the feet of the respective leg assemblies 16, 18, 20 thus forming a pair of stabilizing triangular structures for each of the leg assemblies. Thus, three different triangular structures join each foot of the tripod to the support platform. One triangle is formed by the two leg members 16a, 16b, the foot 24 and the platform 12. A second triangle is formed by leg 16a, stabilizer links 50 and the vertical strut 44a. The third triangle is formed by leg member 16b, vertical strut 44b and stabilizer links 50. The three interlocking triangles connecting the platform 12 to each of the feet 20, 21 and 23 form a very stable, jitter-resistant frame. These triangular structures resist movement in three different directions and thus provide for a very stable platform upon which to place the telescope.

When the scope is being positioned, the stabilizer bolts are withdrawn as shown in FIGS. 4 and 5 and the tripod can be moved around on its wheeled casters. When the desired position for the tripod is reached, the stabilizer bolts may be advanced securing the tripod legs to the ground surface as shown in FIG. 6.

Referring to FIGS. 5 and 6, the foot 24 has a tube 30 which is internally threaded so as to allow the stabilizer bolt 32 to be screwed into and through the end of the foot 24 into the caster 26. The locking knob 36 is tapered and has an internal sleeve portion 37 which screws into the receiving tube 30. When the bolt 32 has been advanced so as to engage the ground surface 14, the wheels 28a and 28b are lifted, thus preventing the tripod from any further movement. In order to secure the desired adjustment, the locking knob 36 is tightened until its forward beveled portion engages the similarly beveled upper end of the tube 30. This locks the stabilizer screw in place.

An alternative foot member 60 is shown in FIG. 7. The foot 60 is joined to each of the legs of the tripod, in this case leg member 49. The foot member includes a jack screw comprising a hollow sleeve 62 which is internally threaded to receive a threaded stabilizer member 64. A hand crank 66 turns the threaded stabilizer member 64 through the sleeve 62 until a pointed end 68 engages a ground surface 47 to the satisfaction of the user. A locking nut 61 is then tightened thereby locking the stabilizer member 64 in place.

The sleeve 62 includes an annular groove 63. This groove is provided to accept a spring-loaded detent mechanism 65. The detent mechanism 65 is included as a locking mechanism on a selectively removable caster assembly 67. The caster assembly 67 includes a pair of wheels 69 (forward wheel not shown). The caster 67 is selectively coupled to the foot by sliding it onto the sleeve 62 until the spring-loaded detent mechanism 65 locks into the annular groove 63.

FIG. 8 shows an alternative construction for the tripod support platform which provides additional structural strength and rigidity. A support platform 70 is shaped to have three sides 70a, 70b and 70c arranged at angles of sixty degrees with respect to one another forming an unconnected equilateral triangle. Three cylinders 72a, 72b and 72c are bolted to the edges of sides 70a, 70b and 70c from underneath the platform 70 (bolts not shown). The cylinders each have axles 74a, 74b and 74c thus forming hinges for their respective leg members. The advantage of the structure in FIG. 8 is that the cylindrical hinges, with their respective axles, form a straight piece of metal joining the ends of the respective leg members. This is structurally more rigid than in the embodiment of FIG. 2, which is lighter and requires less metal.

Several variations of the preferred embodiment may be employed without departing from the spirit of the invention. For example, the casters need not employ a pair of wheels since a single wheel may suffice. Similarly, the platform may have any desired shape. A hexagonal shape is useful for creating the triangles formed by the leg members but other constructions with appropriate pins or rods for forming the narrow ends of the leg member triangles may yield the same result. Also, a single link member may be used to connect the central point to each foot. Fastening devices and methods of attachment of the various links and struts other than those shown may be used if desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A tripod for supporting a device above a ground surface comprising:
    a) a platform base for supporting the device;
    b) three leg assemblies coupled to the platform base, each said leg assembly comprising a triangular structure having an apex located at a foot of each leg assembly and comprising a pair of rods having first ends coupled to said platform base a predetermined distance apart and having distal ends coupled to said foot;
    c) three support link assemblies extending in a substantially vertically downward direction to a central point below said base, each said support link assembly comprising a triangular structure having an apex located at said central point and comprising a pair of members coupled to said base a predetermined distance apart at a first end and coupled together at said central point;
    d) three sets of stabilizer links coupled at one end to said central point and at a second end to a respective one of said leg assemblies; and
    e) three caster assemblies coupled to respective ones of said leg assemblies at a distal end thereof, each caster assembly having a stabilizer member acting adjacent to said caster assembly so as to bear selectively against the ground surface.

2. The tripod of claim 1 wherein said caster assemblies have at least one wheel.

3. The tripod of claim 1 wherein each of said caster assemblies includes a pair of wheels.

4. The tripod of claim 3 wherein said pair of wheels are spaced a predetermined distance apart and said stabilizer member comprises a threaded bolt inserted through a threaded aperture in said foot so as to be selectively extendable between said pair of wheels.

5. The tripod of claim 1 wherein each of said leg assemblies includes a foot having a threaded aperture and wherein said stabilizer member is selectively adjustable through said threaded aperture.

6. The tripod of claim 5 wherein said stabilizer members comprise elongate ground surface engaging members.

7. The tripod of claim 6 wherein said elongate ground surface engaging members are threaded rods.

8. The tripod of claim 7 wherein each of said feet has a threaded aperture adapted to receive said threaded rods.

9. The tripod of claim 1 wherein the platform base includes three hollow cylindrical members coupled to said first ends of each of said rods in each respective leg assembly.

* * * * *